(12) United States Patent
Lu et al.

(10) Patent No.: US 10,891,612 B2
(45) Date of Patent: Jan. 12, 2021

(54) BLOCKCHAIN MEMBER MANAGEMENT DATA PROCESSING METHODS, APPARATUSES, SERVERS, AND SYSTEMS

(71) Applicant: Advanced New Technologies Co., Ltd., Grand Cayman (KY)

(72) Inventors: Xuming Lu, Hangzhou (CN); Husen Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/409,156

(22) Filed: May 10, 2019

(65) Prior Publication Data
US 2019/0347656 A1 Nov. 14, 2019

(30) Foreign Application Priority Data
May 10, 2018 (CN) .......................... 2018 1 0444317

(51) Int. Cl.
*G06Q 20/38* (2012.01)
*G06F 16/182* (2019.01)
*H04L 9/32* (2006.01)

(52) U.S. Cl.
CPC ... *G06Q 20/38215* (2013.01); *G06F 16/1824* (2019.01); *G06Q 20/3829* (2013.01); *H04L 9/3263* (2013.01); *H04L 2209/38* (2013.01)

(58) Field of Classification Search
CPC .......... G06Q 20/38215; G06Q 20/3829; G06F 16/1824; H04L 9/3263; H04L 2209/38
(Continued)

(56) References Cited

U.S. PATENT DOCUMENTS 9,635,000 B1 * 4/2017 Muftic
9,992,022 B1 * 6/2018 Chapman et al.
(Continued)

FOREIGN PATENT DOCUMENTS

CN 105893042 8/2016
CN 106204287 12/2016
(Continued)

OTHER PUBLICATIONS

Certification Authority Renewal, https://docs.microsoft.com/en-us/windows/win32/seccrypto/certification-authority-renewal (Year: 2018).*
(Continued)

*Primary Examiner* — James D Nigh
*Assistant Examiner* — Yin Y Choi
(74) *Attorney, Agent, or Firm* — Fish & Richardson P.C.

(57) ABSTRACT

The present solution discloses methods and apparatuses for automatic processing of member management data in a blockchain. One example method includes storing, in a blockchain, a contract rule, wherein the contract rule includes a rule that is agreed upon by blockchain members and is used for determining registration conditions of registering users for joining a blockchain. Receiving a registration transaction message from a registering user based on the contract rule, wherein the registration transaction message includes identification information of at least one certification authority and a signature certificate of each of the certification authorities identified in the identification information. Verifying the at least one signature certificate based on the identification information by using public keys of the at least one certification authorities in a blockchain node. Finally, in response to determining that the at least one signature certificate are successfully verified, registering, as a new blockchain member, the registering user.

20 Claims, 11 Drawing Sheets

(58) Field of Classification Search
USPC .......................................................... 705/75
See application file for complete search history.

(56) References Cited

U.S. PATENT DOCUMENTS

| | | | |
|---|---|---|---|
| 2013/0197946 | A1* | 8/2013 | Hurry |
| 2017/0048217 | A1* | 2/2017 | Biggs et al. |
| 2018/0048461 | A1 | 2/2018 | Jutla et al. |
| 2018/0225448 | A1* | 8/2018 | Russinovich et al. |
| 2018/0287997 | A1* | 10/2018 | Li et al. |
| 2019/0081800 | A1* | 3/2019 | Uhr et al. |
| 2019/0102409 | A1 | 4/2019 | Shi et al. |

FOREIGN PATENT DOCUMENTS

| | | |
|---|---|---|
| CN | 106533696 | 3/2017 |
| CN | 106651346 | 5/2017 |
| CN | 107171829 | 9/2017 |
| CN | 107528835 | 12/2017 |
| CN | 107547514 | 1/2018 |
| CN | 107733855 | 2/2018 |
| CN | 107993069 | 5/2018 |
| WO | WO 2017145019 | 8/2017 |
| WO | WO 2018019364 | 2/2018 |

OTHER PUBLICATIONS

International Search Report and Written Opinion in International Application No. PCT/US2019/031584, dated Jul. 29, 2019, 6 pages.
Mery et al., Ibm.com [online], "Make your blockchain smart contracts smarter with business rules," Aug. 2017, [retrieved on Aug. 1, 2019], retrieved from: URL<https://www.ibm.com/developerworks/library/mw-1708-mery-blockchain/1708-mery.html>, 17 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Appln No. 19800376.6, dated Sep. 24, 2020, 8 pages.

* cited by examiner

| Reg (message type) | CA1 (certification authority label) | CA2 (certification authority label) | CA3 (certification authority label) | Sig1 (signature certificate) | Sig2 (signature certificate) | Sig3 (signature certificate) |

Field information of a registration transaction message

FIG. 3

| | Black (regulatory method–Blacklist) | User 1 and user 2 (regulatory members) | SigAdm (signature of a regulator) | |
|---|---|---|---|---|

Field information of a member regulatory message

FIG. 7

BLOCKCHAIN MEMBER MANAGEMENT DATA PROCESSING METHODS, APPARATUSES, SERVERS, AND SYSTEMS

CROSS-REFERENCE TO RELATED APPLICATIONS

This application claims priority to Chinese Patent Application No. 201810444317.2, filed on May 10, 2018, which is hereby incorporated by reference in its entirety.

TECHNICAL FIELD

Solutions in implementations of the present specification relate to the field of blockchain data processing technologies, and in particular, to blockchain member management data processing methods, apparatuses, servers, and systems.

BACKGROUND

With the fast development of the Internet, various types of data explosively emerge and grow. Because a blockchain features decentralization, tamper-resistance, distribution, etc., the blockchain has been currently focused and studied in many technical fields.

A blockchain can be classified into a public blockchain, a consortium blockchain, or a private blockchain by audience. Except the public blockchain, identity verification usually needs to be performed for the consortium blockchain and the private blockchain, and only authorized users can join the consortium blockchain and the private blockchain. Currently, users' joining the consortium blockchain and the private blockchain is mainly implemented through centralized management. A dedicated management center for responding to a user registration request, performing verification, etc., for example, an identity management system, can be disposed, and all nodes trust the management center. In a conventional method, if users need to join the blockchain, each user usually needs to apply to the management center for registration, and the management center needs to perform verification on a plurality of pieces of registration information of the user, for example, user information, a credit status, and other credentials information of a member who wants to join the blockchain. After verification succeeds, transaction member registration information is signed and sent to a blockchain node, so that the blockchain node writes the transaction member registration information to the blockchain.

As blockchains are gradually and widely applied to various industries, blockchain processing performance is expected to be higher, and an enterprise service demand needs to be satisfied more flexibly, etc. An enterprise member self-management service demand cannot be satisfied in the existing centralized blockchain member management method.

SUMMARY

Implementations of the present specification are intended to provide blockchain member management data processing methods, apparatuses, servers, and systems, so that whether a member can join a blockchain can be automatically verified based on a contract rule, to implement fast self-management of a consortium blockchain member, improve member management efficiency, and satisfy a service demand of a blockchain user.

The blockchain member management data processing methods, apparatuses, servers, systems provided in the implementations of the present specification are implemented in the following methods:

A blockchain member management data processing method is provided, and the method includes the following: storing a contract rule, where the contract rule includes a rule that is agreed upon by members and is used for determining that a user can join a blockchain, and performing the following steps based on the contract rule: receiving a registration transaction message from a registering user, where the registration transaction message includes identification information of K certification authorities and signature certificates of the K certification authorities, and where $K \geq 1$; performing verification on the signature certificates based on the identification information by using public keys of the corresponding certification authorities in a blockchain node; and determining that the registering user becomes a blockchain member in response to determining that verification on the signature certificates of the K certification authorities succeeds.

A blockchain member management data processing apparatus is provided, and the apparatus includes the following: a contract rule module, configured to store a contract rule, where the contract rule includes a rule that is agreed upon by members and is used for determining that a user can join a blockchain; a registration message receiving module, configured to receive a registration transaction message from a registering user, where the registration transaction message includes identification information of K certification authorities and signature certificates of the K certification authorities, and where $K \geq 1$; a certificate verification module, configured to perform verification on the signature certificates based on the identification information by using public keys of the corresponding certification authorities in a blockchain node; and a member joining module, configured to determine that the registering user becomes a blockchain member in response to determining that verification on the signature certificates of the K certification authorities succeeds.

A server is provided, including a processor and a memory configured to store a processor executable instruction, and the processor performs the following steps when executing the instruction: performing the following steps based on a stored contract rule: receiving a registration transaction message from a registering user, where the registration transaction message includes identification information of K certification authorities and signature certificates of the K certification authorities, and where $K \geq 1$; performing verification on the signature certificates based on the identification information by using public keys of the corresponding certification authorities in a blockchain node; and determining that the registering user becomes a blockchain member in response to determining that verification on the signature certificates of the K certification authorities succeeds.

A member autonomous management system applied to a blockchain-based distributed network is provided, and the system includes a blockchain node storing a contract rule, and where the system performs the method step in any one of the method implementations of the present specification based on the contract rule.

According to the blockchain member management data processing methods, apparatuses, servers, and systems provided in the implementations of the present specification, whether a user can join a blockchain can be automatically verified based on a contract rule in the blockchain. When receiving a registration request from a user, a blockchain node performs verification by using a public key of a corresponding certification authority in the registration request, and it can be determined that the registering user becomes a blockchain member if verification succeeds. The contract rule can be agreed upon by members in advance. The user obtains a signature certificate of the certification authority from the certification authority offchain, and submits the signature certificate during registration. It can be determined that the user becomes a blockchain member after the blockchain node verifies the signature certificate by using the public key of the corresponding certification authority. According to the method provided in the implementations of the present specification, in a decentralized member authentication management method, blockchain member self-management is implemented by using the contract rule. The blockchain node can perform verification based on a signature certificate of a certification authority, to implement onchain verification on registration of a blockchain user, and the blockchain node does not need to perform onchain verification on user registration entity information, thereby implementing fast and efficient blockchain member autonomous management.

BRIEF DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

FIG. 3 is a schematic structural diagram illustrating a registration transaction message, according to an implementation of the present specification;

FIG. 7 is a schematic structural diagram illustrating a member regulatory message, according to the present specification;

DESCRIPTION OF IMPLEMENTATIONS

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

A blockchain technology (BT), also referred to as a distributed ledger technology, is an Internet database technology. The blockchain technology features decentralization, openness, transparency, tamper-resistance of data, etc. Currently, the blockchain technology has been applied to various fields in economy and society, for example, financial services, supply chain management, culture and entertainment, real estate, medical care, and electronic commerce, in addition to digital currencies. A plurality of users or user groups in a blockchain can create a consortium blockchain based on the features of the blockchain technology, to satisfy service development demands of these users or groups. For example, a consortium blockchain is created and includes four blockchain nodes: payment application A, medical service B, movie ticket application C, and taxi hailing application D. In the consortium blockchain, a plurality of preselected nodes in the blockchain are usually designated as ledger nodes for members in a specific group and the limited number of third parties, and generation of each block can be determined by the preselected nodes. These preselected nodes can be generated through voting by using a consensus mechanism. The consensus mechanism can include a mechanism that all blockchain nodes reach an agreement on block information, to ensure that the latest block is accurately added to the blockchain, and blockchain information stored in the nodes is consistent. Current mainstream consensus methods mainly include proof of work, proof of stake, a combination of proof of work and proof of stake, delegated proof of stake, a ripple consensus protocol, etc.

Figure 1:
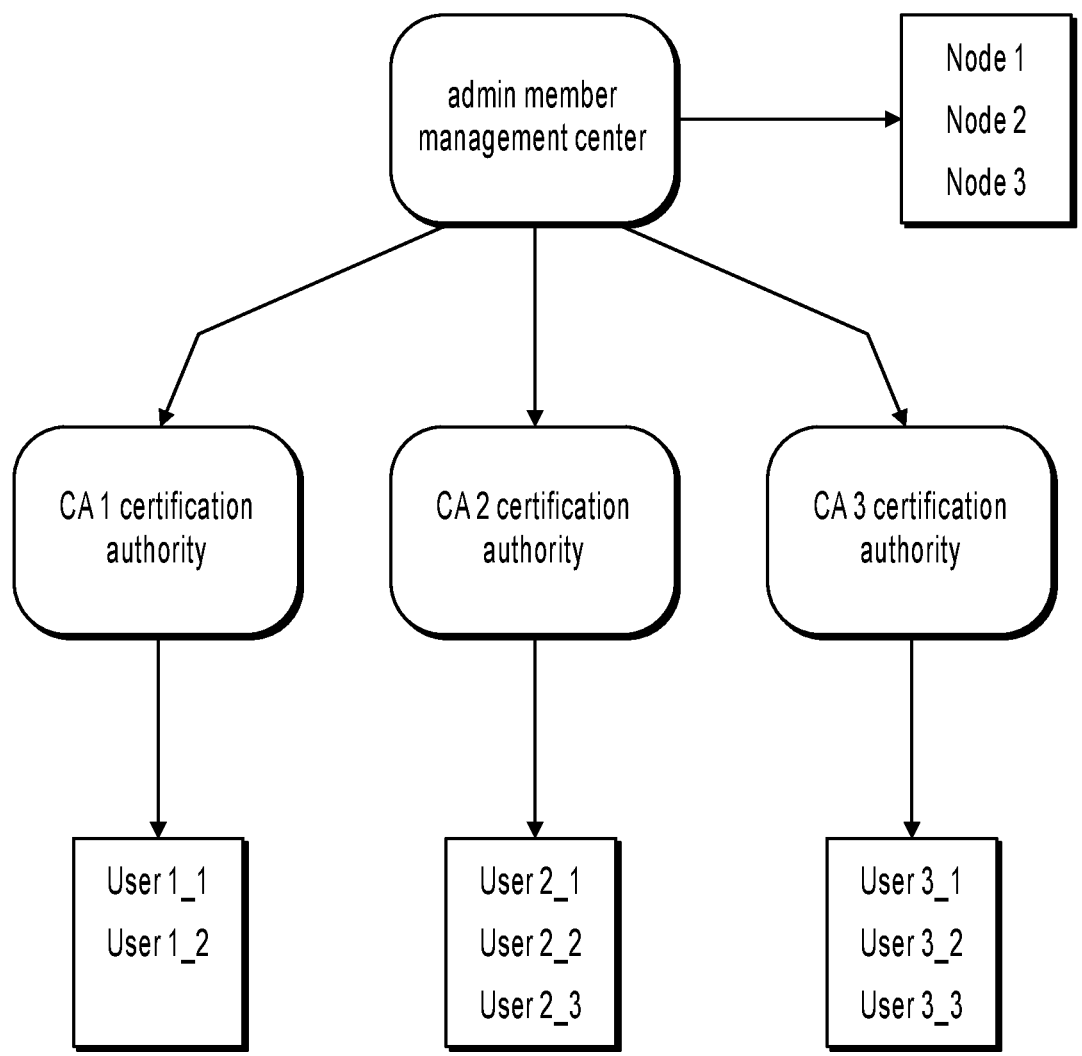
FIG. 1 illustrates an existing centralized member management method involving an administrator.

Currently, an existing blockchain member management mode is mainly centralized member management. FIG. 1 is a schematic diagram illustrating a model of an existing blockchain member management method. One member management center "admin" can manage a plurality of certification service authorities (or referred to as certification authorities) such as CA 1, CA 2, and CA 3, and manage blockchain nodes node 1, node 2, and node 3. Each certification service authority manages members belonging to the certification service authority. FIG. 1 is a schematic diagram illustrating an existing centralized member management method involving an administrator. A dedicated member authentication body can be set. For example, the member management center performs member management, authentication, and decision. In this method, the member management center is trusted by members, member management depends on authority and technology support of the member management center, and member management data security, stability, and reliability cannot be ensured once the member management center is faulty. It is worthwhile to note that a user or a member in the implementations of the present specification can include a single individual, a user group serving as one member, a single enterprise or organization, one or more departments of an enterprise/organization, etc. After being verified, these users of different types can join a consortium blockchain to serve as blockchain nodes and become blockchain members. For ease of description, a user can be referred to as a registering user before joining a blockchain, and can be referred to as a blockchain member after being verified. In FIG. 1, if registering user 3_3 wants to become a blockchain member, the registering user needs to first apply to certification service authority CA 3 for registration. Certification service authority CA 3 can submit a registration request of the user to the member management center "admin", and it can be determined that registering user 3_3 becomes a blockchain member after being verified by "admin". A transaction can be further submitted in a blockchain, to determine that user 3_3 is a new blockchain member.

With development and extension of blockchain technology applications, the implementations of the present specification provide another decentralized blockchain member self-management method (or can be referred to as an autonomous management method). Blockchain members can predetermine a contract rule for joining, exiting, etc. a blockchain by a member. After the contract rule is determined through consensus between blockchain nodes, joining, exiting, etc. a blockchain by a user can be automatically executed and processed in the blockchain, to truly implement blockchain member self-management. The contract rule is usually a clause that is formulated to determine respective rights and obligations and followed by two or more participants in a process of processing or determining a transaction or a service. A conventional contract is usually recorded on paper after an agreement is reached through negotiation and discussion. The contract rule in the implementations of the present specification can be referred to as a smart contract. The contract rule can be a computer program including a transaction-driven digital contract that has a status and runs on a duplicated and shared ledger in blockchain technology applications, and can be a trustworthy operation set performed based on a predetermined rule. In some implementations of the present specification, information for verifying whether a user can join a blockchain and become a blockchain member, execution of signature verification, and a series of data processing rules and operations used for determining a user as a member can be predetermined by blockchain members. The contract rule can be determined after all nodes reach an agreement on contract content. Generally, in a blockchain network, a contract rule is usually resistant to modification after being formulated. However, in the present application, a member autonomous management implementation solution can be directly or indirectly modified based on an agreed member management modification method in the contract rule. The contract rule can be stored in a blockchain genesis block. The genesis block can include a public key or a signature certificate of a certification authority. A registering user who obtains a certificate from the certification authority submits the certificate to the blockchain. A corresponding blockchain account can be created after verification succeeds, and the registering user becomes a blockchain member. Certainly, permission of each member, a registration rule, a privilege setting, etc. can be described by using the contract rule. An infrastructure provider of the consortium blockchain, for example, a trustworthy data source and a clock service provider, can be further described.

Figure 2:
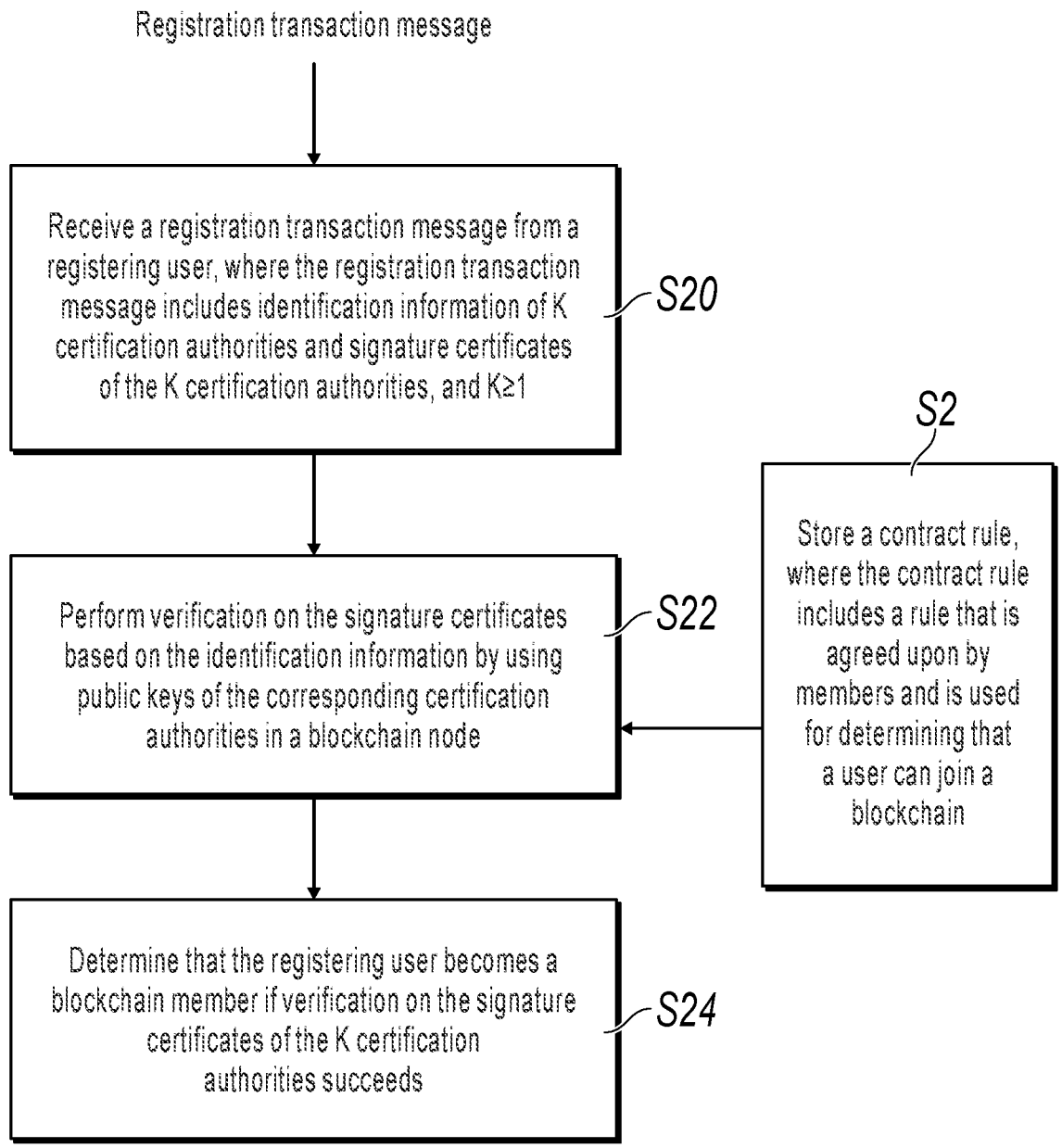
FIG. 2 is a schematic flowchart illustrating an implementation of a blockchain member management data processing method, according to the present specification.

The solutions in the implementations of the present specification are described below by using a specific application scenario in which a user joins a consortium blockchain as an example. FIG. 2 is a schematic flowchart illustrating an implementation of a blockchain member management data processing method, according to the present specification. Although operation steps of a method or structures of an apparatus shown in the following implementations or the accompanying drawings are provided in the present specification, the method or the apparatus can include more or fewer operation steps or module units based on conventional or noncreative efforts. An execution sequence of steps or module structures of the apparatus without a logical causal relationship are not limited to an execution sequence or module structures shown in the implementations of the present specification or the accompanying drawings. When being applied to an actual apparatus, server, or terminal device product application, the method can be performed sequentially or in parallel based on the method or the module structures shown in the implementations or the accompanying drawings (for example, in an environment of parallel processing or multithreaded processing, or even an implementation environment including distributed processing and server clustering).

Certainly, descriptions in the following implementation constitute no limitation on extended technical solutions and application scenarios based on the present specification. For example, in another implementation scenario, the implementation solutions provided in the present specification can also be applied to autonomous management of a blockchain member in a private blockchain or a blockchain similar to a consortium blockchain. A specific implementation is shown in FIG. 2. In an implementation of the blockchain member management data processing method provided in the present specification, the method can include the following steps.

S2. Store a contract rule, where the contract rule includes a rule that is agreed upon by members and is used for determining that a user can join a blockchain, and perform the following steps based on the contract rule:

S20. Receive a registration transaction message from a registering user, where the registration transaction message includes identification information of K certification authorities and signature certificates of the K certification authorities, and K≥1.

S22. Perform verification on the signature certificates based on the identification information by using public keys of the corresponding certification authorities in a blockchain node.

S24. Determine that the registering user becomes a blockchain member if verification on the signature certificates of the K certification authorities succeeds.

Generally, one blockchain node is one blockchain member in the blockchain. After the user joins the blockchain and becomes a blockchain member, member nodes in the blockchain change. For example, payment application A, medical service B, movie ticket application C, and taxi hailing application D are included in a consortium blockchain, and a new blockchain member, namely, vehicle insurance service E becomes another blockchain node in the blockchain. The certification authority can include a registration authority or a dedicated approval authority, and can include a dedicated server, server cluster, registration client device/registration server, registration system, etc. The certification authority can also include a blockchain member or a specified certification management authority. During application of the consortium blockchain in this implementation, a certification authority to which the user needs to apply for a signature certificate offchain can be agreed upon in the contract rule. For example, the user applies to all certification authorities for signature certificates, or the user applies, for a signature certificate based on a service type of the registering user, to a certification authority that monitors the service type or a certification authority that uses the service type or is associated with the service type. After the registering user is verified offchain by one or more certification authorities, signature certificates of the certification authorities can be issued to the registering user. Offchain or onchain described below mainly indicates whether a data operation is performed in the blockchain. For example, operations that are performed outside the blockchain by a corresponding certification authority such as user identity verification, asset verification, and credit verification can be offchain-related operations, and submission of a public key or certificate to the blockchain, verification by a blockchain node, data storage, etc. can be onchain-related operations.

After obtaining the signature certificates of the certification authorities that are needed for joining the blockchain offchain, the registering user can submit the registration transaction message to the blockchain node. For example, if vehicle insurance service E applies for joining the consortium blockchain, to cooperate with a physical enterprise/organization corresponding to payment application A, a registration transaction message is submitted to a blockchain node of payment application A after offchain verification succeeds or a signature certificate of a certification authority is requested. The registration transaction message can include the signature certificates of the certification authorities that are obtained by the registering user, and the identification information of the certification authorities corresponding to these signature certificates. The signature certificate in this implementation can include data information generated by signing using a private key of the certification authority. Correspondingly, whether the signature certificate is issued by the certification authority can be verified by using a corresponding public key. Certainly, the registration transaction message can further include other message content, for example, indicating that the message is a message type registered by the new user, or some identity information of the user, based on an agreement or an application demand. FIG. 3 is a schematic structural diagram illustrating a registration transaction message, according to an implementation of the present specification.

Figure 4:
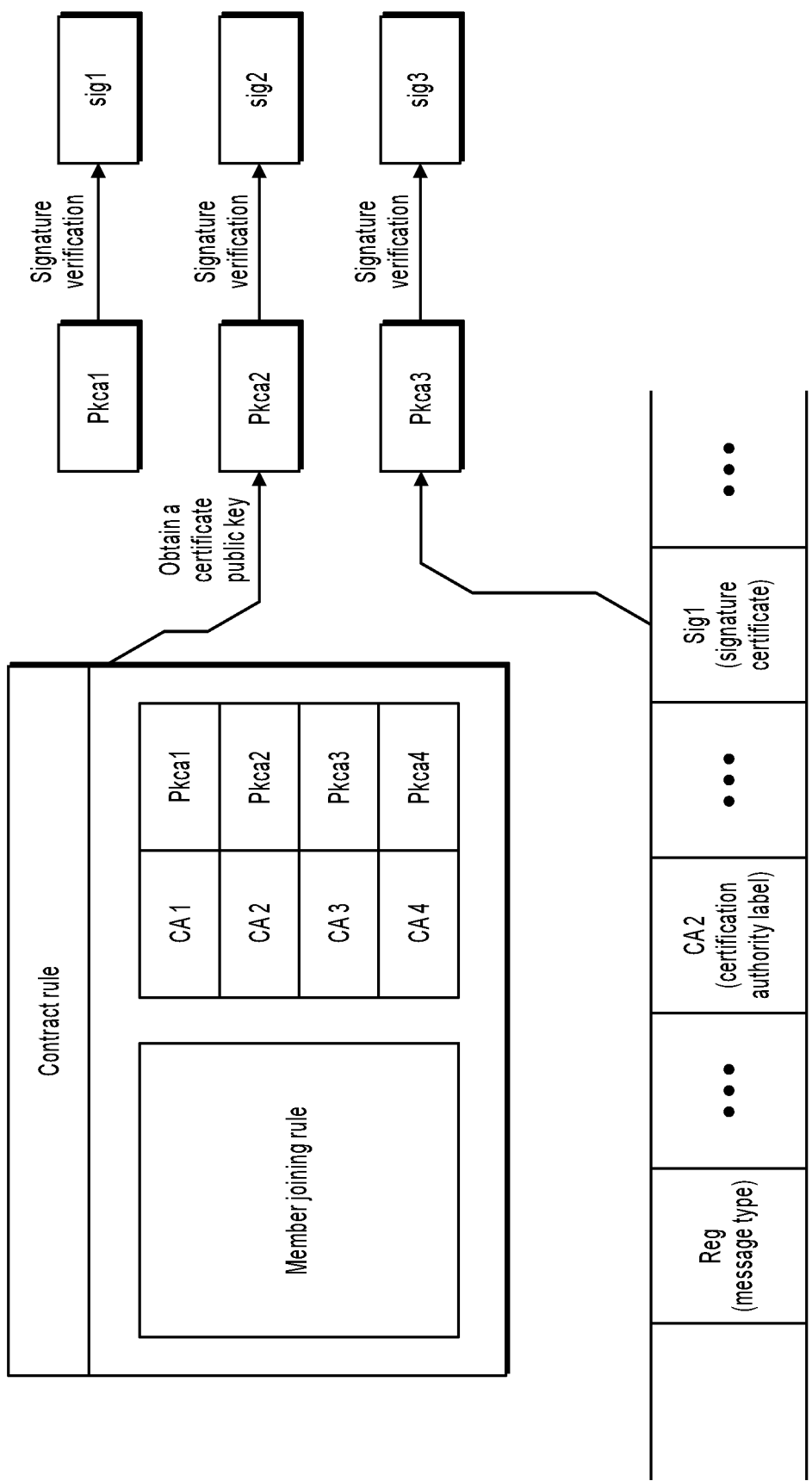
FIG. 4 is a schematic diagram illustrating processing a user registration transaction request, according to an implementation of the present specification.

After receiving the registration transaction message, the blockchain node can obtain the identification information of the K certification authorities, the signature certificates of the K certification authorities, and other information content. The blockchain node performs verification on the signature certificates included in the registration transaction message based on the identification information by using the public keys of the corresponding certification authorities. If verification on the K signature certificates succeeds, it can be determined that the registering user is a blockchain member. A corresponding operation of processing data of a blockchain member can be performed at an application layer based on a design. For example, the data is synchronized or is not synchronized to a client device. FIG. 4 is a schematic diagram illustrating processing a user registration transaction request, according to an implementation of the present specification. The blockchain node can obtain public keys PKca1, PKca2, and PKca3 of corresponding certification authorities CA 1, CA 2, and CA 3 from the blockchain based on the registration transaction message, and perform verification on the signature certificates in the registration transaction message by using the corresponding public keys. Certainly, in another implementation of the present specification, the registering user may need to obtain signature certificates of all certification authorities. Verification is performed on the signature certificates by using corresponding public keys, and it is determined that the user is a blockchain member after verification succeeds.

Figure 5:
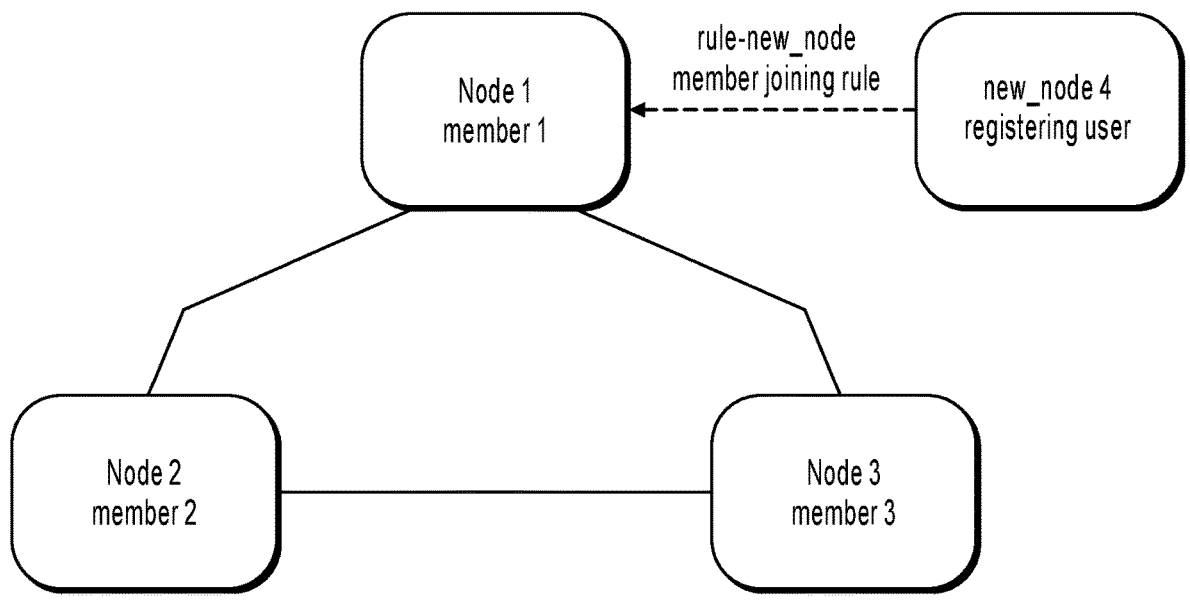
FIG. 5 is a schematic diagram illustrating an implementation scenario of the method, according to the present specification.
Figure 5:
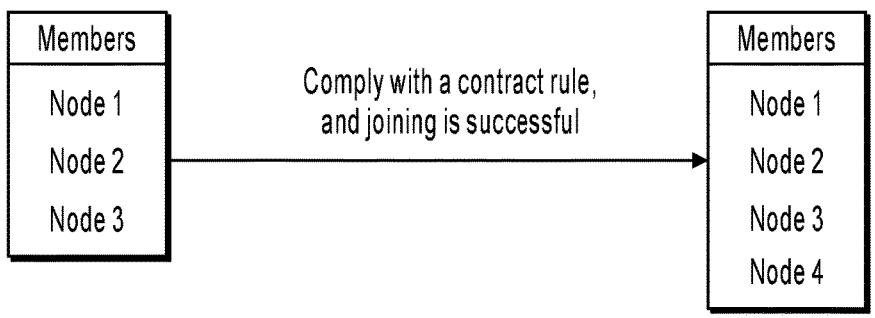

According to the blockchain member management data processing method provided in the implementations of the present specification, whether a user can join a blockchain can be automatically verified based on a contract rule in the blockchain. When receiving a registration request from a user, a blockchain node performs verification by using a public key of a corresponding certification authority in the registration request, and it can be determined that the registering user becomes a blockchain member if verification succeeds. The contract rule can be agreed upon by members in advance. The user obtains a signature certificate of the certification authority from the certification authority offchain, and submits the signature certificate during registration. It can be determined that the user becomes a blockchain member after the blockchain node verifies the signature certificate by using the public key of the corresponding certification authority. FIG. 5 is a schematic diagram illustrating an implementation scenario of the method, according to the present specification. As shown in FIG. 5, if a user wants to register as a new blockchain node member, verification is automatically performed on the user based on a contract rule after a registration transaction message is submitted to a blockchain. If verification succeeds, it can be determined that the user becomes a blockchain member, and can register with another blockchain node in the consortium blockchain by using a transaction. According to the method provided in the implementations of the present specification, in a decentralized member authentication management method, blockchain member self-management is implemented by using the contract rule. The blockchain node can perform verification based on a signature certificate of a certification authority, to implement onchain verification on registration of a blockchain user, and the blockchain node does not need to perform onchain verification on user registration entity information, thereby implementing fast and efficient blockchain member autonomous management.

Figure 6:
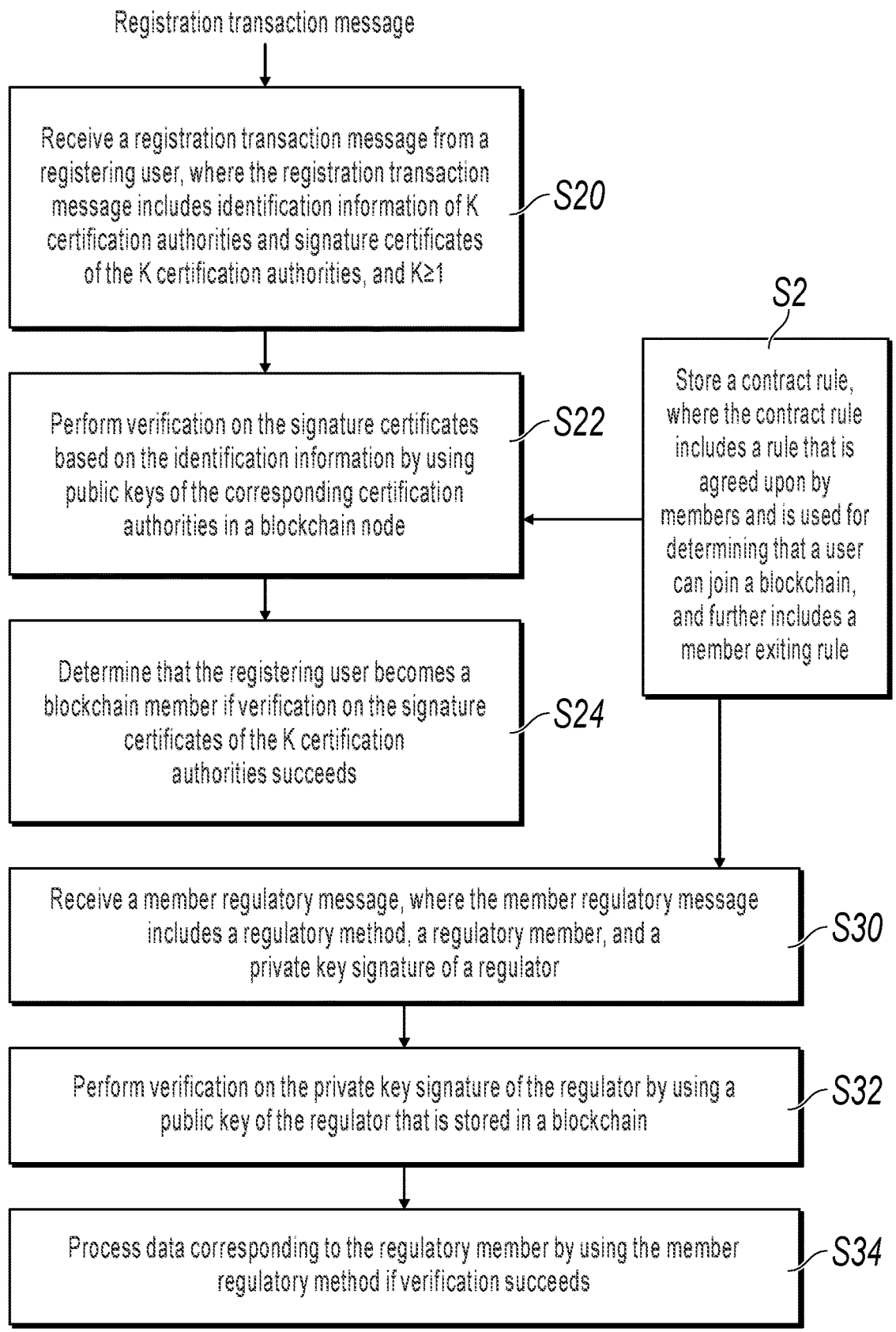
FIG. 6 is a schematic flowchart illustrating another implementation of the method, according to the present specification.

A processing solution for joining a blockchain by a member in the blockchain member management data processing method is described in the previous implementations of the present specification, and the present specification further provides a blockchain member management data processing method for exiting a blockchain by a member. It can be seen based on the previous descriptions that a specific member exiting situation, a specific exiting processing method, etc. can also be predetermined in a contract rule. Exiting usually can include some special member management methods including one or more types of processing solutions, for example, adding a member to a blacklist, removing a member from a blockchain (the member is no longer a blockchain node in the blockchain), limiting permission of a member, and degradation. As shown in FIG. 6, in another implementation of the method provided in the present specification, the following steps are further performed based on the contract rule:

S30. Receive a member regulatory message, where the member regulatory message includes a regulatory method, a regulatory member, and a private key signature of a regulator, and the regulatory method and the regulator that has permission to send the regulatory message are written to the contract rule.

S32. Perform verification on the private key signature of the regulator by using a public key of the regulator that is stored in a blockchain.

S34. Process data corresponding to the regulatory member by using the member regulatory method if verification succeeds.

The regulatory method can include the addition to a blacklist and the removal from the blockchain, and can also include other processing methods such as credit rank degradation. The member regulatory message can include the private key signature of the regulator that sends the message. The blockchain can store the public key of the regulator, to verify whether the message is sent by an authorized regulator. One member regulatory message can include content for regulating one regulatory member, or can include content for regulating a plurality of regulatory members in some other implementations. FIG. 7 is a schematic structural diagram illustrating a member regulatory message, according to the present specification.

In some implementations, the member regulatory message can include a message sent by a specified regulator, for example, a member regulatory message sent by a national financial regulatory authority such as the People's Bank of China or China Securities Regulatory Commission. In some other implementations, a regulator with regulatory effectiveness, for example, one or more specified members, can be agreed in the contract rule in advance. Alternatively, in another implementation, after a member regulatory message is agreed upon by the predetermined number or proportion of members, the member regulatory message has regulatory effectiveness, and the member regulatory message can be automatically executed based on the contract rule. The predetermined number or proportion of members can constitute a regulatory member group here. For example, there are ten members in the blockchain, and it can be predetermined that the member regulatory message has regulatory effectiveness if seven members or 70% of members agree on content (e.g., limiting permission of a member) of the member regulatory message. Therefore, in another implementation of the method provided in the present specification, the member regulatory message can include at least one of the following: a regulatory message sent by an authorized regulatory authority; a regulatory message sent by a specified member; or a regulatory message sent by a regulatory member group, where the number of members in the regulatory member group satisfies the agreed number or proportion of members with regulatory effectiveness in the contract rule.

In some implementations of the present specification, the user submits the registration transaction message, and a key pair verification certificate is generated for the user, or a certificate is issued for a public key submitted by the user after verification by the certification authority succeeds. The user who obtains the signature certificate from the certification authority can submit the public key and the certificate to the blockchain. After verification succeeds, an account corresponding to the public key can be created. The blockchain can verify whether a subsequent operation on the account is signed by using a corresponding private key. In some implementations of the present specification, the account can be an organization account, or can be a personal account. An organization usually includes a plurality of departments, and therefore the account can include an account of each department. The personal account, the organization account, or the department account can correspond to a blockchain node in the blockchain. Accounts can be associated with each other in a certification authority (CA). In another implementation of the method provided in the present specification, accounts corresponding to the members in blockchain data include an account type of a multi-hierarchical tree structure. The multi-hierarchical structure can include a structure of at least two hierarchies, for example, first-level organization accounts A and B, and second-level department accounts A1, A2, B1, and B2, and certainly can further include third-level accounts, fourth-level accounts, etc. The accounts based on the multi-hierarchical tree structure can facilitate blockchain member account management, for example, member permission allocation and security regulation.

In another implementation of the method provided in the present specification, an implementation solution in which a key is dynamically updated can be further used, and can include that a regulator dynamically updates a key, or the certification authority dynamically updates a key. Key updating frequency can be customized, or key updating is triggered based on a specific event, for example, an organization change and a new financial regulation provision. Dynamic key updating can effectively enhance blockchain transaction security and tighten transaction regulation. Therefore, in another implementation of the method provided in the present specification, the method can further include the following:

S4. Dynamically update key information of at least one of the certification authority or a regulator.

During specific implementation, the regulator can generate one temporary key pair each time. For example, a public key and a private key can be generated once a day or once a week. Generated temporary key information can be broadcast in the blockchain, and is recorded by each blockchain node. The regulator can sign a public key in temporary keys by using a previous private key of the regulator. The blockchain node performs verification by using a previous public key, and updates a public key of the corresponding regulator after verification succeeds. As such, during next verification, verification and other processing can be performed on the member regulatory message by using the dynamically updated public key. Certainly, for a method for dynamically updating a public key of the certification authority, references can be made to the implementation in the previous descriptions.

The implementations of the method in the present specification are described in a progressive way. For same or similar parts of the implementations, references can be made to the implementations. Each implementation focuses on a difference from the other implementations. For related parts, references can be made to partial descriptions in the method implementations.

Figure 8:
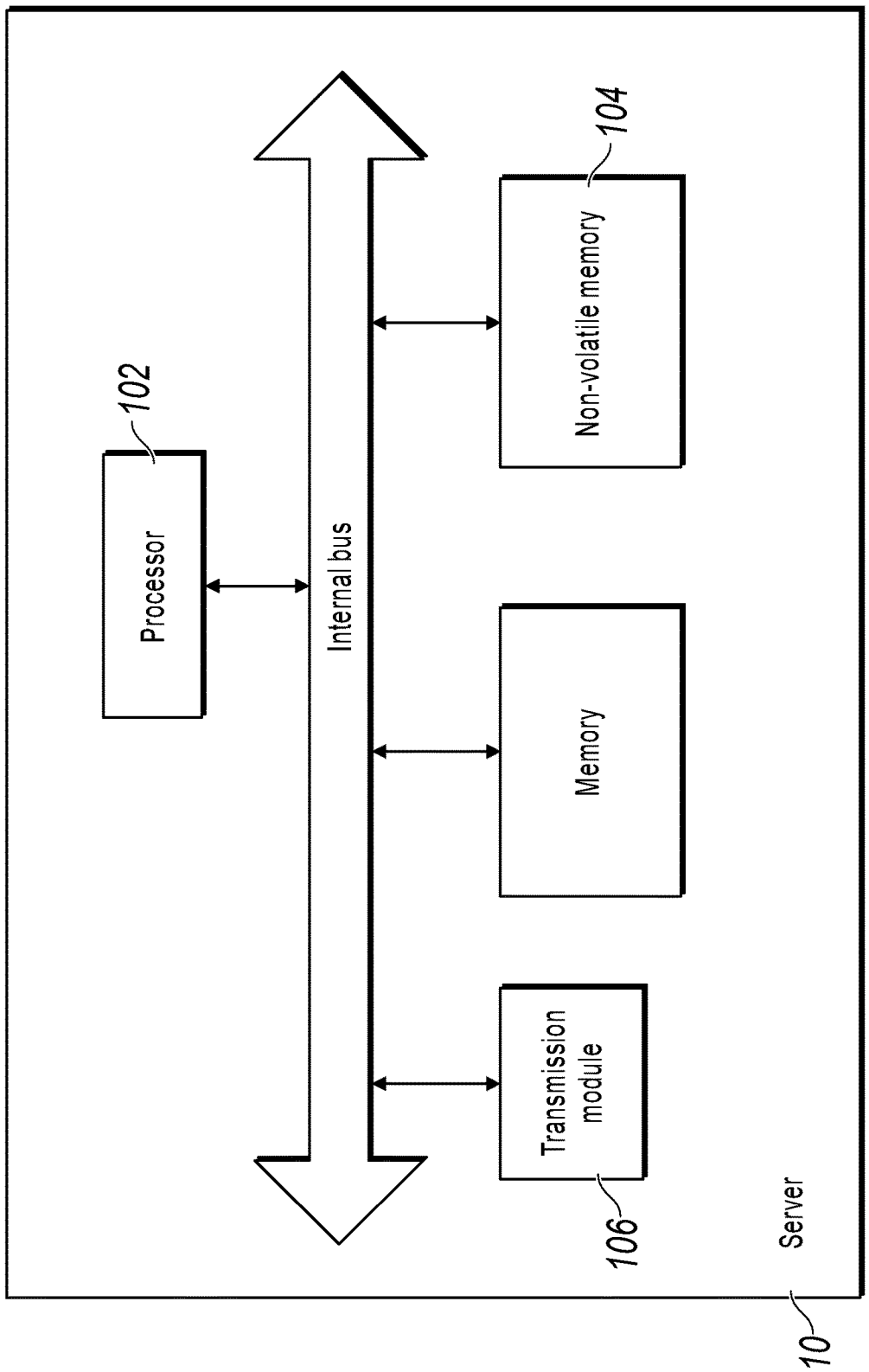
FIG. 8 is a structural block diagram illustrating hardware of a server in a blockchain member management data processing method, according to an implementation of the present disclosure.

The method implementations provided in the implementations of the present specification can be performed by a mobile terminal device, a computer terminal device, a server, or a similar operation apparatus. A server running on a distributed system is used as an example. FIG. 8 is a structural block diagram illustrating hardware of a server in a blockchain member management data processing method, according to an implementation of the present disclosure. As shown in FIG. 8, the server 10 can include one or more (only one is shown in the figure) processors 102 (the processor 102 can include but is not limited to a processing apparatus such as a microprocessor MCU or a programmable logic device (e.g., FPGA)), a memory 104 configured to store data, and a transmission module 106 with a communication function.

A person of ordinary skill in the art can understand that the structure shown in FIG. 8 is merely an example, and constitutes no limitation on a structure of the electronic apparatus. For example, the server 10 can further include more or fewer components than those shown in FIG. 8, for example, can further include other processing hardware such as a graphics processing unit (GPU) or have a configuration different from that shown in FIG. 8.

The memory 104 can be configured to store a software program and a module of application software, for example, a program instruction/module corresponding to a search method in the implementations of the present disclosure. The processor 102 executes various function applications and data processing by running the software program and the module stored in the memory 104, to implement the blockchain member management data processing method. The memory 104 can include a high-speed random access memory, and can further include a nonvolatile memory, for example, one or more magnetic storage apparatuses, a flash memory, another nonvolatile mechanical hard disk, or a solid memory. In some examples, the memory 104 can further include remote memories relative to the processor 102. These remote memories can be connected to the server 10 by using a network. Examples of the network include but are not limited to the Internet, an enterprise intranet, a local area network, a mobile communications network, and a combination thereof.

The transmission module 106 is configured to receive or send data by using a network. Specific examples of the network can include a wireless network provided by a communications supplier of the server 10. In an example, the transmission module 106 includes a network interface controller (NIC). The network interface controller can be connected to another network device by using a base station, to communicate with the Internet. In an example, the transmission module 106 can be a radio frequency (RF) module. The transmission module is configured to wirelessly communicate with the Internet.

Figure 9:
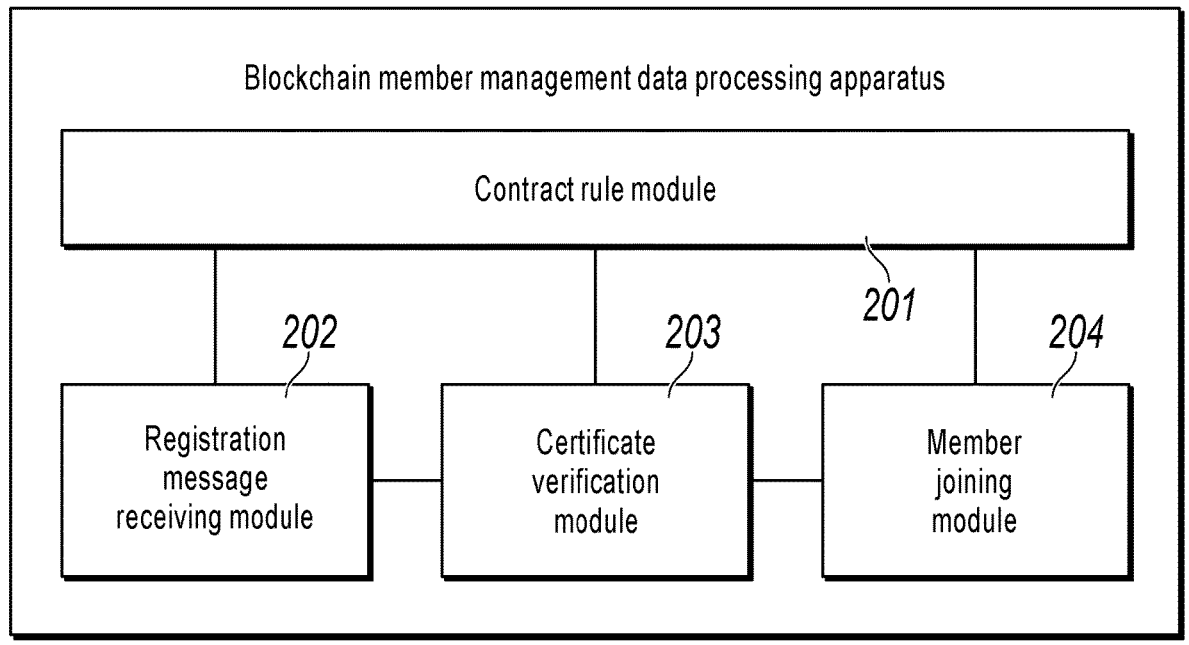
FIG. 9 is a schematic structural diagram illustrating modules in an implementation of a blockchain member management data processing apparatus, according to the present specification.

Based on the previous blockchain member management data processing method, the present specification further provides a blockchain member management data processing apparatus. The apparatus can include a device apparatus that uses a system (including a distributed system), software (an application), a module, a component, a server, a client device, etc. in the method in the implementations of the present specification and uses necessary implementation hardware. Based on the same creative concept, a processing apparatus provided in an implementation of the present specification is described in the following implementations. Because a problem-resolving implementation solution of the apparatus is similar to that of the method, for specific implementation of the processing apparatus in the implementations of the present specification, references can be made to the implementation of the previous method. No repeated description is provided. Although the apparatus described in the following implementations is preferably implemented by software, implementation of hardware or a combination of software and hardware is possible to conceive. FIG. 9 is a schematic structural diagram illustrating a module in an implementation of a blockchain member management data processing apparatus that can be used on a side of a blockchain node server. The data processing apparatus can include the following: a contract rule module 201, configured to store a contract rule, where the contract rule includes a rule that is agreed upon by members and is used for determining that a user can join a blockchain; a registration message receiving module 202, configured to receive a registration transaction message from a registering user, where the registration transaction message includes identification information of K certification authorities and signature certificates of the K certification authorities, and K≥1; a certificate verification module 203, configured to perform verification on the signature certificates based on the identification information by using public keys of the corresponding certification authorities in a blockchain node; and a member joining module 204, configured to determine that the registering user becomes a blockchain member if verification on the signature certificates of the K certification authorities succeeds.

As described in the previous method implementation, in another implementation of the apparatus provided in the present specification, the apparatus can further include the following: a regulatory message receiving module 205, configured to receive a member regulatory message, where the member regulatory message includes a regulatory method, a regulatory member, and a private key signature of a regulator, and the regulatory method and the regulator that has permission to send the regulatory message are written to the contract rule; a signature verification module 206, configured to perform verification on the private key signature of the regulator by using a public key of the regulator that is stored in the blockchain; and a member exiting module 207, configured to process data corresponding to the regulatory member by using the member regulatory method if verification on the private key signature succeeds.

Figure 10:
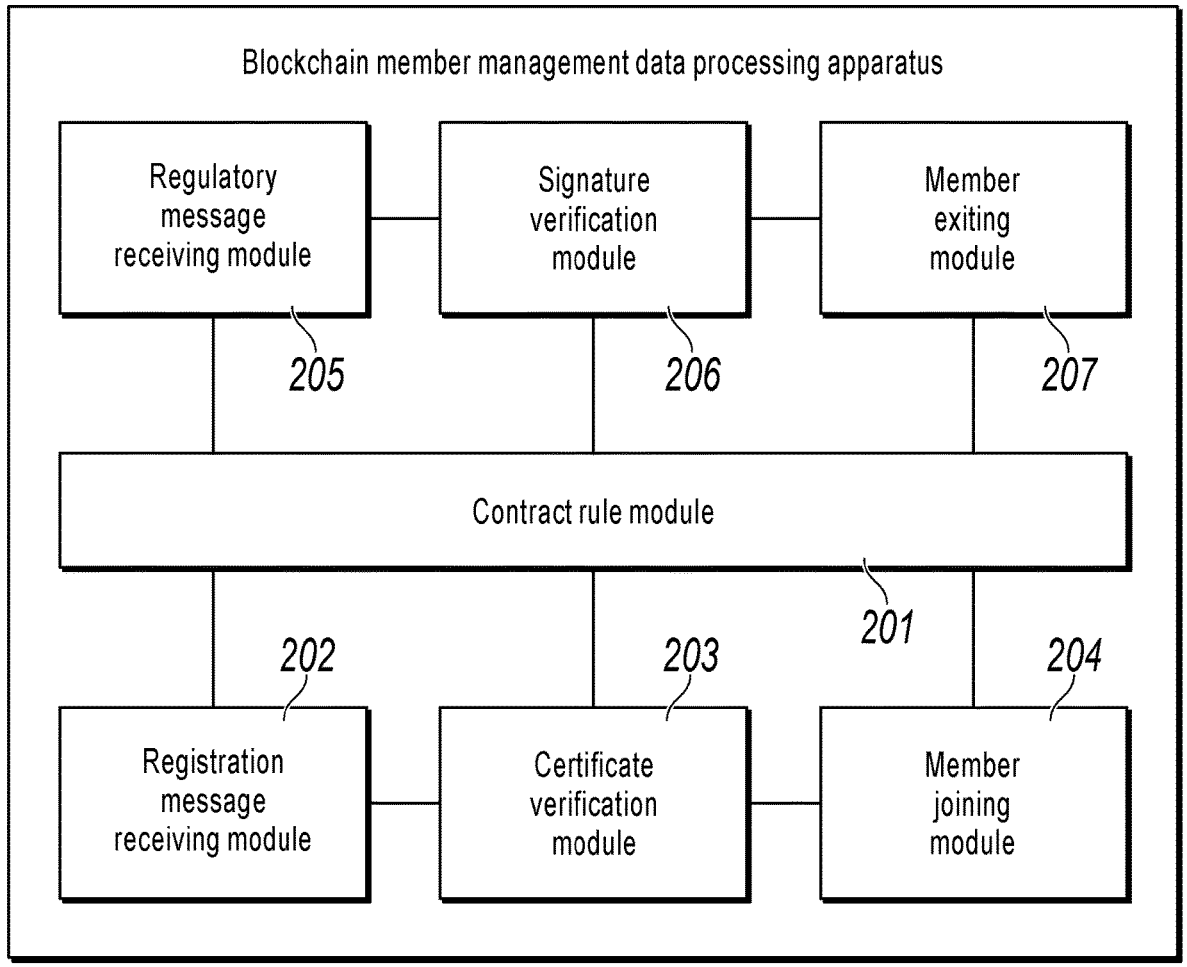
FIG. 10 is a schematic structural diagram illustrating a module in an implementation of another blockchain member management data processing apparatus, according to the present specification.

FIG. 10 is a schematic structural diagram illustrating a module in an implementation of another blockchain member management data processing apparatus, according to the present specification.

In another implementation of the apparatus provided in the present specification, the member regulatory message can include at least one of the following: a regulatory message sent by an authorized regulatory authority; a regulatory message sent by a specified member; or a regulatory message sent by a regulatory member group, where the number of members in the regulatory member group satisfies the agreed number or proportion of members with regulatory effectiveness in the contract rule.

In another implementation of the apparatus provided in the present specification, accounts corresponding to the members in blockchain data can include an account type of a multi-hierarchical tree structure.

In another implementation of the apparatus provided in the present specification, the apparatus can further include a dynamic updating module 208, configured to dynamically update key information of at least one of the certification authority or a regulator.

A device model identification method provided in the implementations of the present specification can be implemented by a processor executing a corresponding program instruction in a computer, for example, implemented at a PC end/server end by using c++/java language in a Windows/Linux operating system, implemented by hardware necessary for programming language set corresponding to another system such as Android or iOS, or implemented based on processing logic of a quantum computer. In an implementation of implementing the previous method by a server provided in the present specification, the server can include a processor and a memory configured to store a processor executable instruction. The processor performs the following steps when executing the instruction: storing a contract rule, where the contract rule includes a rule that is agreed upon by members and is used for determining that a user can join a blockchain, and performing the following steps based on the stored contract rule: receiving a registration transaction message from a registering user, where the registration transaction message includes identification information of K certification authorities and signature certificates of the K certification authorities, and K≥1; performing verification on the signature certificates based on the identification information by using public keys of the corresponding certification authorities in a blockchain node; and determining that the registering user becomes a blockchain member if verification on the signature certificates of the K certification authorities succeeds.

Based on the descriptions in the method implementation, in another implementation of the server, the processor further performs the following steps when executing the instruction: receiving a member regulatory message, where the member regulatory message includes a regulatory method, a regulatory member, and a private key signature of a regulator, and the regulatory method and the regulator that has permission to send the regulatory message are written to the contract rule; performing verification on the private key signature of the regulator by using a public key of the regulator that is stored in the blockchain; and processing data corresponding to the regulatory member by using the member regulatory method if verification succeeds.

The instruction can be stored in a plurality of computer readable storage media. The computer readable storage medium can include a physical apparatus configured to store information. The information can be digitized and then stored by using media that uses an electric method, a magnetism method, an optic method, etc. The computer readable storage medium in this implementation can include an apparatus that stores information in the electric method, for example, various memories such as a RAM or a ROM; an apparatus that stores information in the magnetism method, for example, a hard disk, a floppy disk, a magnetic tape, a magnetic core memory, a bubble memory, or a USB flash drive; and an apparatus that stores information in the optic method, for example, a CD or a DVD. Certainly, there is a readable storage medium of another form, for example, a quantum memory or a graphene memory. An instruction in the apparatus, server, a client device, processing device, or system in this implementation is described as above.

The previous method or apparatus can be applied to a blockchain to implement member autonomous management. A blockchain member verified by using a contract rule has a relatively low risk, and member management efficiency can be greatly improved through decentralized member autonomous management, thereby improving overall blockchain service experience. Based on the descriptions in the previous implementations, the present specification further provides a member autonomous management system that can be applied to a blockchain-based distributed network. The system includes a blockchain node storing a contract rule, and the system performs the method step in any one of the method implementations based on the contract rule.

It is worthwhile to note that the apparatus, server, and system in the implementations of the present specification can further include another implementation based on the descriptions in the related method implementations. For a specific implementation, references can be made to the descriptions in the method implementations. Details are omitted here for simplicity.

The implementations of the present specification are described in a progressive way. For same or similar parts of the implementations, references can be made to the implementations. Each implementation focuses on a difference from the other implementations. Especially, a hardware and program implementation is basically similar to the method implementations, and therefore is described briefly. For related parts, references can be made to partial descriptions in the method implementations.

Certain implementations of the present specification are described above. Other implementations fall within the scope of the appended claims. In some situations, the actions or steps described in the claims can be performed in a sequence different from the sequence in the implementations and the desired results can still be achieved. In addition, the process described in the accompanying drawings does not necessarily require a particular sequence to achieve the desired results. In some implementations, multi-task processing and parallel processing can be advantageous.

Although method operation steps in the implementations or the flowcharts are provided in the present application, more or fewer operation steps can be included based on conventional or noncreative efforts. The sequence of the steps listed in the implementations is merely one of numerous step execution sequences, and does not represent the unique execution sequence. For an actual apparatus or a client device product, the steps can be performed based on the method sequence in the implementations or accompanying drawings or performed in parallel (for example, an environment of parallel processing or multi-threaded processing).

According to the blockchain member management data processing method and apparatus, the server, and the system provided in the implementations of the present specification, whether a user can join a blockchain can be automatically verified based on a contract rule in the blockchain. When receiving a registration request from a user, a blockchain node performs verification by using a public key of a corresponding certification authority in the registration request, and it can be determined that the registering user becomes a blockchain member if verification succeeds. The contract rule can be agreed upon by members in advance. The user obtains a signature certificate of the certification authority from the certification authority offchain, and submits the signature certificate during registration. It can be determined that the user becomes a blockchain member after the blockchain node verifies the signature certificate by using the public key of the corresponding certification authority. According to the method provided in the implementations of the present specification, in a decentralized member authentication management method, blockchain member self-management is implemented by using the contract rule. The blockchain node can perform verification based on a signature certificate of a certification authority, to implement onchain verification on registration of a blockchain user, and the blockchain node does not need to perform onchain verification on user registration entity information, thereby implementing fast and efficient blockchain member autonomous management.

The method for performing verification on a user for joining a blockchain, the definition of the regulator, the hierarchical tree structure of the account, and key dynamic update, operations such as data acquisition, location arrangement, interaction, calculation, and determining, and data descriptions are mentioned in the content of the implementations of the present specification. However, the implementations of the present specification are not limited to complying with an industry communication standard, a standard blockchain data processing method, a communication protocol, and a standard data model/template or situations described in the implementations of the present specification. An implementation solution obtained by using some industry standards, or in a self-defined way, or by slightly modifying the implementation described in the implementations can also achieve an implementation effect the same as, equivalent to, or similar to that achieved in the previous implementations, or an expected implementation effect obtained after transformation. An implementation that is obtained by applying a modified or transformed data acquisition, storage, determining, and processing method can still fall within an optional implementation solution range of the present specification.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (e.g., FPGA)) is such an integrated circuit, and a logical function of the PLD is determined by a user through device programming. The designer independently performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be, for example, a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicon Labs C8051F320. The memory controller can also be implemented as a part of control logic of a memory. A person skilled in the art should also know that in addition to implementing the controller by using the computer readable program code, logic programming can be performed on the method steps to allow the controller to implement the same function in forms of the logic gate, the switch, the application-specific integrated circuit, the programmable logic controller, and the embedded microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, an in-vehicle human-machine interaction device, a cellular phone, a camera phone, a smartphone, a personal digital assistant, a media player, a navigation device, an email device, a game console, a tablet computer, a wearable device, or any combination of these devices.

Although the method operation steps in the implementations or the flowcharts are provided in the implementations of the present specification, more or fewer operation steps can be included based on conventional or noncreative means. The sequence of the steps listed in the implementations is merely one of numerous step execution sequences, and does not represent the unique execution sequence. For an actual apparatus or terminal device product, the steps can be performed based on the method sequence in the implementations or the accompanying drawings or performed in parallel (for example, an environment of parallel processing or multi-threaded processing, or even a distributed data processing environment). Terms "include", "contain", or their any other variant is intended to cover non-exclusive inclusion, so that a process, a method, an article, or a device that includes a series of elements not only includes these elements, but also includes other elements that are not expressly listed, or further includes elements inherent to such a process, method, article, or device. An element described by "includes a . . . " further includes, without more constraints, another same or identical element in the process, method, article, or device that includes the element.

For ease of description, the previous apparatus is described by dividing the functions into various modules. Certainly, when the implementations of the present specification are implemented, functions of various modules can be implemented in one or more pieces of software and/or hardware, modules that implement the same function can be implemented by using a combination of a plurality of submodules or subunits, etc. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art should also know that in addition to implementing the controller by using the computer readable program code, logic programming can be performed on the method steps to allow the controller to implement the same function in forms of the logic gate, the switch, the application-specific integrated circuit, the programmable logic controller, and the embedded microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The present disclosure is described with reference to the flowcharts and/or block diagrams of the method, the device (system), and the computer program product in the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that an apparatus for implementing a specific function in one or more processes in the flowcharts and/or in one or more blocks in the block diagrams can be generated by using the instructions executed by the computer or the processor of the another programmable data processing device.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

The implementations of the present specification can be described in the general context of computer-executable instructions, for example, a program module. Generally, the program module includes a routine, a program, an object, a component, a data structure, etc. executing a specific task or implementing a specific abstract data type. The implementations of the present specification can alternatively be practiced in distributed computing environments where tasks are performed by remote processing devices that are connected through a communications network. In the distributed computing environment, the program module can be located in both local and remote computer storage media including storage devices.

The implementations of the present specification are described in a progressive way. For same or similar parts of the implementations, references can be made to the implementations. Each implementation focuses on a difference from the other implementations. Especially, a system implementation is basically similar to the method implementations, and therefore is described briefly. For related parts, references can be made to partial descriptions in the method implementations. In the descriptions of the present specification, reference terms such as "an implementation", "some implementations", "example", "specific example", and "some examples" mean that specific features, structures, materials, or characteristics described with reference to the implementation or example are included in at least one implementation or example in the implementations of the present specification. In the present specification, the example expressions of the previous terms are not necessarily with respect to the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification provided that they do not conflict with each other.

The previous descriptions are merely implementations of the present specification, and are not intended to limit the implementations of the present specification. For a person skilled in the art, the implementations of the present specification can have various changes and variations. Any modifications, equivalent substitutions, and improvements made within the spirit and the principle of the implementations of the present specification shall fall within the scope of the claims of the implementations of the present specification.

As described herein, the present solution and description relates to implementations of automated blockchain member management. Implementations allow for a distributed method for verifying and adding or removing blockchain members in a private or consortium blockchain. A contract rule is establish which can determine the requirements for registration and regulation of blockchain members. New blockchain members can be added by submitting a registration transaction message, where the registration transaction message contains identification information of one or more certification authorities and one or more signature certificates of the certification authorities. These certificates can be verified using public keys to ensure the new blockchain member's registration transaction message is authentic. Blockchain members can also be subject to regulatory operation which can include removal from the blockchain, blacklisting, limiting of permissions, or demotion in a hierarchical structure within the blockchain.

The proposed solution provides technical advantages, in that member self-management of a blockchain allows faster authorization and higher processing performance. Additionally, demand for service can be satisfied more flexibly. Further, the solution can alleviate security risks that are inherent in a centralized authority management center that responds to user registration requests.

Figure 11:
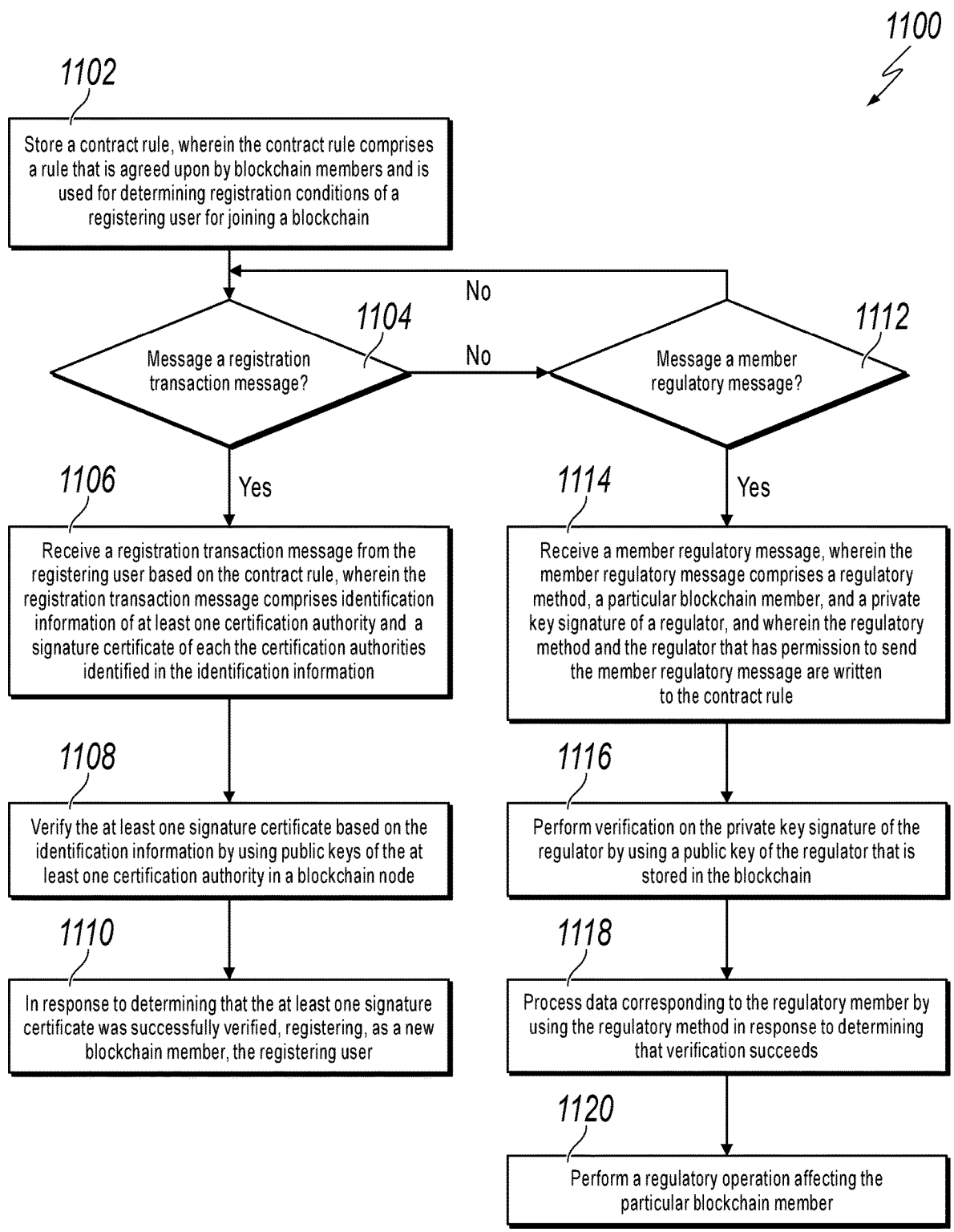
FIG. 11 is a flowchart illustrating an example of a computer-implemented method for processing blockchain member management data, according to an implementation of the present disclosure.

FIG. 11 is a flowchart illustrating an example of a computer-implemented method 1100 for processing blockchain member management data, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a contract rule is stored. The contract rule can include a rule that is agreed upon by blockchain members, and is used for determining registration conditions of registering users for joining a blockchain. The contact rule can also include a regulatory method and one or more regulators that have authority to send regulatory messages. For example, in a consortium blockchain, a new user may be able to join using the appropriate certificate signatures from existing blockchain members, and become a member of the blockchain. In so doing, the new user, as a member of the blockchain, can automatically become a new blockchain node. The contract rule can be a clause that determines respective rights and obligations that apply to two or more participants during processing and/or analyzing a transaction or service. The contract rule can include, for example, information for verifying whether a user can join a blockchain and become a blockchain member, a public key for execution of signature verification, and a series of data processing rules and operations used for determining a user as a member. In one implementation, the contract rule can be predetermined and stored in a blockchain genesis block. In another implementation, the contract rule is determined after all nodes in the blockchain reach an agreement on contract content. From 1102, method 1100 proceeds to 1104.

At 1104 it is determined whether an incoming message is a registration transaction message. If the incoming message is not a registration transaction message, method 1100 proceeds to 1112. If it is determined that the incoming message is a registration transaction message, method 1100 proceeds to 1106.

At 1106, a registration transaction message is received from a registering user based on the contract rule. The registration transaction message includes identification information of at least one certification authority and at least one signature certificate of the certification authority. For example, a private blockchain may have three certification authorities. In such instances, the registration transaction message will include identification information of the three certification authorities, as well as a signature certificate from each authority that has been created using the certification authority's private signature key. In one implementation, the registration transaction message includes additional content. For example, the registration transaction message can include a message type, information about the user, among additional information required based on a predetermined agreement in the contract rule, among other information or data.

The certification authorities can be, but are not limited to, members of the blockchain or a specified management authority. Certification authorities can include a dedicated server, server cluster, registration system, or registration client device among other things. A new user can apply for the certification authorities' signature certificates offchain, or through any suitable method or operation. The requirements to apply for a signature certificate can be agreed upon in the contract rule. In one implementation, the registering user must apply to all certification authorities for certificates. In another implementation only the certificates which are applicable to the type of registering user are required. For example, a registering user for an automotive retailer may only need the certificates from other automotive retailer certification authorities in the blockchain.

A consortium or private blockchain can have a multi-hierarchical tree structure. For example, a top tier of the hierarch can include, but is not limited to, industry level nodes, which may include banking, automotive, and retail nodes, among others. A second tier of the hierarchy tree can include specific company nodes within an industry. Further tiers could include departments or divisions within the company, among other things. Each member of the blockchain can also have an account type, which corresponds to a tier or level in the multi-hierarchical tree structure.

In one implementation, the certification authority's private and public keys are dynamically updated. For example, the regulator may generate a new key pair daily, weekly, or at another regular or irregular interval. The frequency of dynamically updating the key information can be stored in the contract rule, agreed upon by the blockchain members, or otherwise customizable. Specifically, the certification authority can generate a new key pair using any suitable method or operation, and can transmit the new public key of that new key pair to other certification authorities in the blockchain. The other certification authorities can use the previous public key to perform a verification, and can then update the public key of the corresponding certification authority after the verification succeeds. From 1106, method 1100 proceeds to 1108.

At 1108, at least one signature certificate is verified based on the identification information by using public keys of the at least one certification authority in a blockchain node. The verification can be performed by a blockchain node, where the blockchain node can obtain the public keys of the certification authorities from the corresponding certification authorities in the blockchain based on the registration transaction message. From 1108, method 1100 proceeds to 1110.

At 1110, after determination is made that the at least one signature certificate has been successfully verified, the registering user becomes a new blockchain member. The new blockchain member can now act as a node in the blockchain, and can perform transactions with other nodes in the blockchain.

Returning to 1104, if a determination is made that an incoming message is not a registration transaction message, method 1100 proceeds to 1112. At 1112 it is determined whether the incoming message is a member regulatory message. If the incoming message is not a member regulatory message, method 1100 can end, or may wait for additional messages. If the incoming message is a member regulatory message, method 1100 proceeds to 1114.

At 1114, a member regulatory message is received. The member regulatory message includes a regulatory method, a particular blockchain member, and a private key signature of a regulator. The regulatory method and the regulator that has permission to send the member regulatory message are written into the contract rule. The regulator can be a specified member of the blockchain, a regulatory member group, or an authorized regulatory authority, among other things. The regulatory member group can be a subset of the blockchain members. In one implementation the number of regulatory members is a predetermined number. In another implementation the number of regulatory members is a predetermined proportion of the total number of blockchain members. For example, the predetermined proportion may be a simple majority of the blockchain members with regulatory effectiveness (regulatory member group) in the contract rule. The regulator's private and public keys can be dynamically updated similarly to the certification authority's keys as described above. From 1114, method 1100 proceeds to 1116.

At 1116, a verification on the private key signature of the regulator is performed using a public key of the regulator that is stored in the blockchain. From 1116, method 1100 proceeds to 1118.

At 1118, data corresponding to the particular blockchain member is processed by using the regulatory method in response to determining that the verification of 1116 has succeeded. In one implementation the verification is determined to have succeeded if the predetermined proportion, or predetermined number of regulators all agree on the content of the regulatory message. If verification succeeds, a regulatory operation can be performed. From 1118, method 1100 proceeds to 1120.

At 1120, a regulatory operation affecting the particular blockchain member is performed. In one implementation the regulatory operation includes adding the particular blockchain member to a blacklist. Blacklisting prevents the particular blockchain member from further accessing the blockchain or participating in transactions. Blacklisting can also prevent a former blockchain member from re-registering, even if all other credentials are otherwise met.

In another implementation the particular blockchain member is simply removed from the blockchain. The particular blockchain member is no longer able to act as a blockchain node in the blockchain.

In yet another implementation the regulatory operation affecting particular blockchain member can be a degradation of the blockchain member in a multi-hierarchical tree structure of the blockchain. In another example the regulatory operation can include a credit rank degradation. Alternatively the regulatory operation can limit permissions of the particular blockchain member. For example, removing permission to act as a regulator, or certification authority. After 1120 method 1100 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   storing a contract rule, wherein the contract rule comprises a rule that is agreed upon by blockchain members and is used for determining registration conditions of registering users for joining a blockchain;
   receiving a registration transaction message from a registering user based on the contract rule, wherein the registration transaction message comprises identification information of at least one certification authority and a signature certificate of each of the certification authorities identified in the identification information;
   generating a new public key for one or more of the at least one certification authority, wherein generating the new public key comprises
      determining updated key information of a certification authority to update an expired public key to the new public key,
      cryptographically signing, by the certification authority, the new public key using an expired private key, and
      verifying, by one or more of the blockchain members, the new public key using the expired public key,
   verifying the signature certificate for each of the at least one certification authorities based on the identification information by using the new public keys of the one or more of the at least one certification authorities in a blockchain node; and
   in response to determining that the at least one signature certificate are successfully verified, registering, as a new blockchain member, the registering user.

2. The computer-implemented method of claim 1, further comprising: receiving a member regulatory message, wherein the member regulatory message comprises a regulatory method, a particular blockchain member, and a private key signature of a regulator, and wherein the regulatory method and the regulator that has permission to send the member regulatory message are written to the contract rule; verifying the private key signature of the regulator by using a public key of the regulator stored in the blockchain; and in response to determining that the private key signature of the regulator is successfully verified, processing data corresponding to the particular blockchain member by using the regulatory method.

3. The computer-implemented method of claim 2, wherein the member regulatory message is sent by at least one of: an authorized regulatory authority; a specified blockchain member; or a regulatory member group, wherein a number of blockchain members in the regulatory member group satisfies an agreed number or a predetermined proportion of blockchain members with regulatory effectiveness in the contract rule.

4. The computer-implemented method of claim 3, wherein the agreed number or the predetermined proportion of the blockchain members with regulatory effectiveness in the contract rule comprises a majority of the blockchain members with regulatory effectiveness in the contract rule.

5. The computer-implemented method of claim 3, further comprising: determining whether the agreed number or the predetermined proportion of the blockchain members with regulatory effectiveness in the contract rule agree on a content of the member regulatory message; and in response to determining that the agreed number or the predetermined proportion of the blockchain members with regulatory effectiveness in the contract rule agree on the content, performing a regulatory operation affecting a particular blockchain member.

6. The computer-implemented method of claim 5, wherein performing the regulatory operation comprises at least one of: adding the particular blockchain member to a blacklist; removing the particular blockchain member from the blockchain; limiting a permission of the particular blockchain member; or degrading the particular blockchain member in a multi-hierarchical tree structure of the blockchain.

7. The computer-implemented method of claim 1, wherein blockchain accounts corresponding to the blockchain members in the blockchain comprise an account type of a multi-hierarchical tree structure.

8. The computer-implemented method of claim 1, further comprising: dynamically updating key information of at least one of the of the at least one certification authority or at least one regulator.

9. The computer-implemented method of claim 8, wherein dynamically updating the key information is based on a customizable updating frequency.

10. The computer-implemented method of claim 1, wherein the blockchain comprises a consortium blockchain.

11. A non-transitory, computer-readable medium storing one or more instructions executable by a computer system to perform operations comprising:
storing a contract rule, wherein the contract rule comprises a rule that is agreed upon by blockchain members and is used for determining registration conditions of registering users for joining a blockchain;
receiving a registration transaction message from a registering user based on the contract rule, wherein the registration transaction message comprises identification information of at least one certification authority and a signature certificate of each of the certification authorities identified in the identification information;
generating a new public key for one or more of the at least one certification authority, wherein generating the new public key comprises
  determining updated key information of a certification authority to update an expired public key to the new public key,
  cryptographically signing, by the certification authority, the new public key using an expired private key, and
  verifying, by one or more of the blockchain members, the new public key using the expired public key;
verifying the signature certificate for each of the at least one certification authorities based on the identification information by using the new public keys of the one or more of the at least one certification authorities in a blockchain node; and
in response to determining that the at least one signature certificate are successfully verified, registering, as a new blockchain member, the registering user.

12. The computer-readable medium of claim 11, the operations further comprising: receiving a member regulatory message, wherein the member regulatory message comprises a regulatory method, a particular blockchain member, and a private key signature of a regulator, and wherein the regulatory method and the regulator that has permission to send the member regulatory message are written to the contract rule; verifying the private key signature of the regulator by using a public key of the regulator stored in the blockchain; and in response to determining that the private key signature of the regulator is successfully verified, processing data corresponding to the particular blockchain member by using the regulatory method.

13. The computer-readable medium of claim 12, wherein the member regulatory message is sent by at least one of: an authorized regulatory authority; a specified blockchain member; or a regulatory member group, wherein a number of blockchain members in the regulatory member group satisfies an agreed number or a predetermined proportion of blockchain members with regulatory effectiveness in the contract rule.

14. The computer-readable medium of claim 13, wherein the agreed number or the predetermined proportion of the blockchain members with regulatory effectiveness in the contract rule comprises a majority of the blockchain members with regulatory effectiveness in the contract rule.

15. The computer-readable medium of claim 13, the operations further comprising: determining whether the agreed number or the predetermined proportion of the blockchain members with regulatory effectiveness in the contract rule agree on a content of the member regulatory message; and in response to determining that the agreed number or the predetermined proportion of the blockchain members with regulatory effectiveness in the contract rule agree on the content, performing a regulatory operation affecting a particular blockchain member; wherein the regulatory operation comprises at least one of: adding the particular blockchain member to a blacklist; removing the particular blockchain member from the blockchain; limiting a permission of the particular blockchain member; or degrading the particular blockchain member in a multi-hierarchical tree structure of the blockchain.

16. The computer-readable medium of claim 11, wherein blockchain accounts corresponding to the blockchain members in the blockchain comprise an account type of a multi-hierarchical tree structure.

17. The computer-readable medium of claim 11, the operations further comprising: dynamically updating key information, based on a customizable updating frequency, of at least one of the of the at least one certification authority or at least one regulator.

18. The computer-readable medium of claim 11, wherein the blockchain comprises a consortium blockchain.

19. A computer-implemented system, comprising: one or more computers; and one or more computer memory devices interoperably coupled with the one or more computers and having tangible, non-transitory, machine-readable media storing one or more instructions that, when executed by the one or more computers, perform operations comprising:
storing a contract rule, wherein the contract rule comprises a rule that is agreed upon by blockchain members and is used for determining registration conditions of registering users for joining a blockchain;

receiving a registration transaction message from a registering user based on the contract rule, wherein the registration transaction message comprises identification information of at least one certification authority and a signature certificate of each of the certification authorities identified in the identification information;

generating a new public key for one or more of the at least one certification authority, wherein generating the new public key comprises determining updated key information of a certification authority to update an expired public key to the new public key, cryptographically signing, by the certification authority, the new public key using an expired private key, and verifying, by one or more of the blockchain members, the new public key using the expired public key;

verifying the signature certificate for each of the at least one certification authorities based on the identification information by using the new public keys of the one or more of the at least one certification authority in a blockchain node; and in response to determining that the at least one signature certificate are successfully verified, registering, as a new blockchain member, the registering user.

20. The computer-implemented system of claim 19, the operations further comprising:

receiving a member regulatory message, wherein the member regulatory message comprises a regulatory method, a particular blockchain member, and a private key signature of a regulator, and wherein the regulatory method and the regulator that has permission to send the member regulatory message are written to the contract rule;

verifying the private key signature of the regulator by using a public key of the regulator stored in the blockchain; and in response to determining that the private key signature of the regulator is successfully verified, processing data corresponding to the particular blockchain member by using the regulatory method.

* * * * *